(12) United States Patent
Fauri

(10) Patent No.: US 12,491,966 B2
(45) Date of Patent: Dec. 9, 2025

(54) DRIVE-BRAKE ARRANGEMENT FOR A WHEEL, AND ELECTRIC BICYCLE

(71) Applicant: Porsche eBike Performance GmbH, Ottobrunn (DE)

(72) Inventor: Mikel Fauri, Ludwigsburg (DE)

(73) Assignee: Porsche eBike Performance GmbH, Ottobrunn (DE)

( * ) Notice: Subject to any disclaimer, the term of this patent is extended or adjusted under 35 U.S.C. 154(b) by 0 days.

(21) Appl. No.: 18/713,369

(22) PCT Filed: Jul. 7, 2022

(86) PCT No.: PCT/EP2022/025318
§ 371 (c)(1),
(2) Date: May 24, 2024

(87) PCT Pub. No.: WO2023/094018
PCT Pub. Date: Jun. 1, 2023

(65) Prior Publication Data
US 2025/0019032 A1    Jan. 16, 2025

(30) Foreign Application Priority Data

Nov. 26, 2021  (DE) ..................... 10 2021 131 055.5

(51) Int. Cl.
*B62M 6/65* (2010.01)
*B62L 1/00* (2006.01)
(Continued)

(52) U.S. Cl.
CPC .................. *B62M 6/65* (2013.01); *B62L 1/00* (2013.01); *B62M 6/90* (2013.01); *B62M 11/02* (2013.01); *B62M 9/02* (2013.01)

(58) Field of Classification Search
CPC .......... B62M 6/65; B62M 6/90; B62M 11/02; B62M 9/02; B62L 1/00; B62L 1/005; B62L 3/02
See application file for complete search history.

(56) References Cited

U.S. PATENT DOCUMENTS 4,346,777 A     8/1982 Restelli
2016/0329775 A1  11/2016 Jang
(Continued)

FOREIGN PATENT DOCUMENTS

CN        112803659       5/2021
DE    10 2010 001 980    8/2011
(Continued)

*Primary Examiner* — Tinh Dang
(74) *Attorney, Agent, or Firm* — Gerald E. Hespos; Michael J. Porco

(57) ABSTRACT

A drive-brake arrangement for a wheel of an electric bicycle includes a motor (24) with a stator (26) and a disk-shaped rotor (28). The stator (26) is connected directly or indirectly to a frame part (32) and encloses the rotor (28) in an at least partially annular manner. The rotor (28) has permanent magnets (50) and is connected operatively to a drive shaft (46) for conjoint rotation therewith. The rotor (28) has a rotational speed $n_R$ and the drive shaft (46) has a rotational speed $n_A$. A brake caliper (34) is mounted on the frame part (32) and encloses a brake disc (38) in an at least partially annular manner. The brake disc (38) is connected operatively to the driveshaft (46) for conjoint rotation therewith. The rotor (28) is connected operatively to the driveshaft (46) via a planetary transmission (48) and achieves a transmission ratio $i = n_R/n_A > 1$.

7 Claims, 2 Drawing Sheets

(51) Int. Cl.
  *B62M 6/90*   (2010.01)
  *B62M 11/02*  (2006.01)
  *B62M 11/16*  (2006.01)
  *B62M 9/02*   (2006.01)

(56) References Cited

U.S. PATENT DOCUMENTS

| | | | |
|---|---|---|---|
| 2017/0163138 A1 | 6/2017 | Pohl | |
| 2017/0361899 A1 | 12/2017 | Russwurm | |
| 2019/0003534 A1* | 1/2019 | Estepa Rodriguez | ... B60K 7/00 |
| 2021/0061409 A1* | 3/2021 | Ricco | ...... B62L 1/005 |

FOREIGN PATENT DOCUMENTS

| | | | |
|---|---|---|---|
| DE | 10 2014 107 382 | 12/2014 | |
| DE | 10 2019 108 378 | 10/2020 | |
| DE | 10 2019 114 120 | 12/2020 | |
| EP | 2818393 | 12/2014 | |
| WO | 2010077300 | 7/2010 | |
| WO | 2013124892 | 8/2013 | |
| WO | WO-2013143005 A1 * | 10/2013 | ............... B62L 5/00 |
| WO | 2021031973 | 2/2021 | |
| WO | WO-2021044293 A1 * | 3/2021 | ............. B62K 21/18 |
| WO | WO-2021094078 A1 * | 5/2021 | ........... B60K 7/0007 |

* cited by examiner

DRIVE-BRAKE ARRANGEMENT FOR A WHEEL, AND ELECTRIC BICYCLE

FIELD OF THE INVENTION

The invention relates to a drive-brake arrangement for a wheel of a muscle-powered vehicle, in particular an electric bicycle The invention also relates to an electric bicycle with a frame arrangement and two wheels. A front wheel is mounted pivotably and is connected to a steering arrangement, with a pedal drive arrangement. At least one battery member is arranged on the frame arrangement and has at least one such drive-brake arrangement.

BACKGROUND OF THE INVENTION

Drive-brake arrangements and electric bicycles equipped therewith are well known from the prior art. In this context, reference is made only by way of example to US 2017/0361899. The drive-brake arrangement of US 2017/0361899 has both a disk motor and a brake arrangement provided on a frame part, and both are connected operatively to a corresponding wheel hub. Thus, energy transmission, energy recovery and, of course, a braking function can be carried out by such a drive-brake arrangement. The electric motor of US 2017/0361899 has a stator connected to a frame part of a frame arrangement and encloses, in an at least partially annular manner, a disk-shaped rotor that has a speed $n_R$. The disk-shaped rotor comprises permanent magnets and is connected operatively to a drive shaft having a speed $n_A$ for conjoint rotation therewith. A brake caliper is arranged on the frame part and has brake shoes. The brake caliper encloses, in an at least partially annular manner, a brake disk that also is connected operatively to the drive shaft for conjoint rotation therewith. However, the disadvantage of such a drive-brake arrangement is that, owing to the limited installation space, only a direct drive is provided, which leads to restricted performance data for the drive assistance.

It is therefore the object of the invention to avoid the abovementioned disadvantage in a simple and cost-effective manner.

SUMMARY OF THE INVENTION

The above-described object is achieved according to the invention in that the rotor is connected operatively to the drive shaft via a planetary transmission in a transmission housing part in such a way that a transmission ratio $i=nR/nA>1$ is present. This makes it possible to use a high-speed motor with much better performance data.

In one embodiment, a sun gear of the planetary transmission is connected operatively to the rotor, and planet gears of the planetary transmission are connected operatively to the drive shaft. A ring gear is connected fixedly to the frame part. This means that the planetary transmission can have a very compact design and can be connected to the drive shaft or the frame part in a simple manner. In a particularly advantageous manner, bearing members of the planet gears can be connected fixedly to the brake disk. It is also advantageous if the ring gear is connected fixedly to the brake caliper, thereby making it possible to increase the compactness even further.

In some embodiments, the rotor is mounted pivotably on the brake disk, thereby allowing a relative movement between the brake disk and the rotor.

In a particularly advantageous manner, the stator is arranged on the transmission housing part.

Another aspect of the invention relates to an electric bicycle with at least one such drive-brake arrangement, in which an inverter is connected electrically to the drive-brake arrangement. This also allows energy recovery to occur via the disk motor, so that the at least one battery member of the electric bicycle is charged while riding. The invention will be explained in more detail on the basis of a drawing.

DETAILED DESCRIPTION

Figure 1:
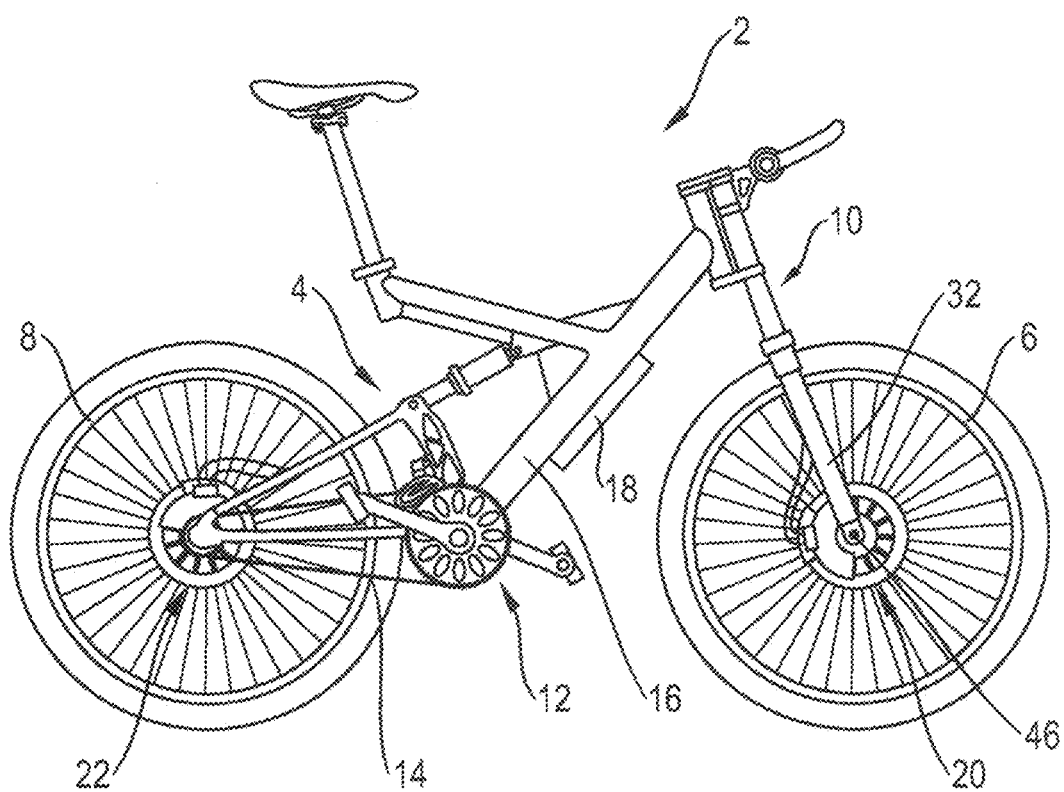
FIG. 1 is a side view of an electric bicycle according to the invention.

FIG. 1 shows an electric bicycle 2 according to the invention in a side view. The electric bicycle 2 has, in a known manner, a frame arrangement 4 on which two wheels, a front wheel 6 and a rear wheel 8, are mounted pivotably. The front wheel 6 is connected to a steering arrangement 10 in a known manner. The electric bicycle 2 can be driven with muscle power via a pedal drive arrangement 12, which, in a known manner, comprises a chain transmission 14. A battery member 18 is connected electrically to drive-brake arrangements 20, 22 in a known manner, and is provided in a known manner on a down tube 16 of the frame arrangement 4. In the illustrated embodiment, both the front wheel 6 and the rear wheel 8 each have a drive-brake arrangement 20, 22. It should be clear that, depending on the application, only the front wheel 6 can have a drive-brake arrangement 20 or only the rear wheel 8 can have a drive-brake arrangement 22.

The exact structure of the drive-brake arrangements 20, 22 is explained in more detail with reference to the drive-brake arrangements 20 in FIGS. 2 to 4.

Figure 2:
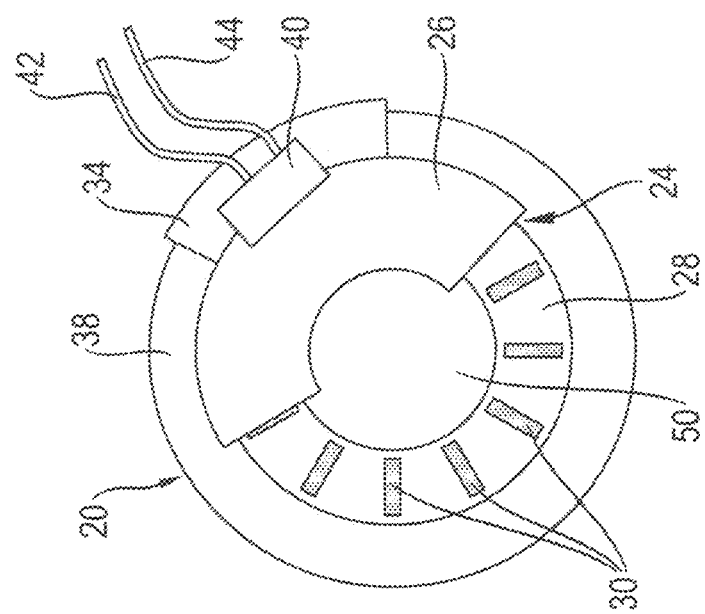
FIG. 2 is a front view of a drive-brake arrangement according to the invention.

FIG. 2 is a front view of the drive-brake arrangement 20 for the front wheel 6. Here, the drive-brake arrangement 20 comprises an electric motor 24 that is designed as a disk motor and in a known manner has a stator 26 and a disk-shaped rotor 28. The reference sign 30 is used to designate permanent magnets of the rotor 28. In the illustrated embodiment, the stator 26 is connected fixedly to a frame part 32, here the front wheel fork (see FIG. 1 in this respect). Here, the stator 26 is configured in such a way that it partially annularly encloses the disk-shaped rotor 28 in a known manner. FIG. 2 also shows a brake caliper 34 that is connected operatively to a brake disk 38 via brake shoes 36 (see FIG. 3 in this respect) in a known manner. The brake caliper 34 also partially annularly encloses the brake disk 38.

The battery member 18 shown in FIG. 1 is connected electrically to the disk motor 24 via an inverter 40, with there being shown here an electrical connection line 42 and a hydraulic connection line 44 for supplying the brake caliper 34 in a known manner with hydraulic oil. The disk-shaped rotor 28 and the brake disk 38 are connected to a drive shaft 46 (see FIG. 1 in this respect) for conjoint rotation therewith. In order to be able to implement the disk motor 24 as a high-speed motor and to ensure an optimal power transmission, according to the invention, the rotor 28 is connected via a planetary transmission 48 (see FIG. 3 in this respect), of which a transmission housing part 50 is shown here. In the present embodiment, the stator 26 is arranged on the transmission housing part 50.

Figure 3:
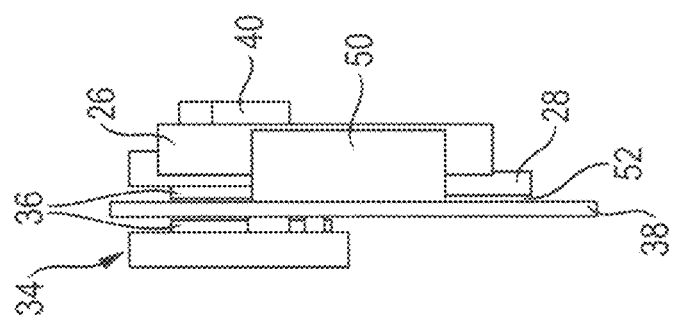
FIG. 3 is a side view of the drive-brake arrangement of FIG. 2.

FIG. 3 is a side view of the drive-brake arrangement 20. FIG. 3 clearly shows that the brake caliper 34 with the brake shoes 36 act on the brake disk 38 during a braking operation. It can also be seen in the side view how the rotor 28 is mounted pivotably on the brake disk 38 via bearing means 52 to allow a relative movement between the rotor 28 and the brake disk 38.

Figure 4:
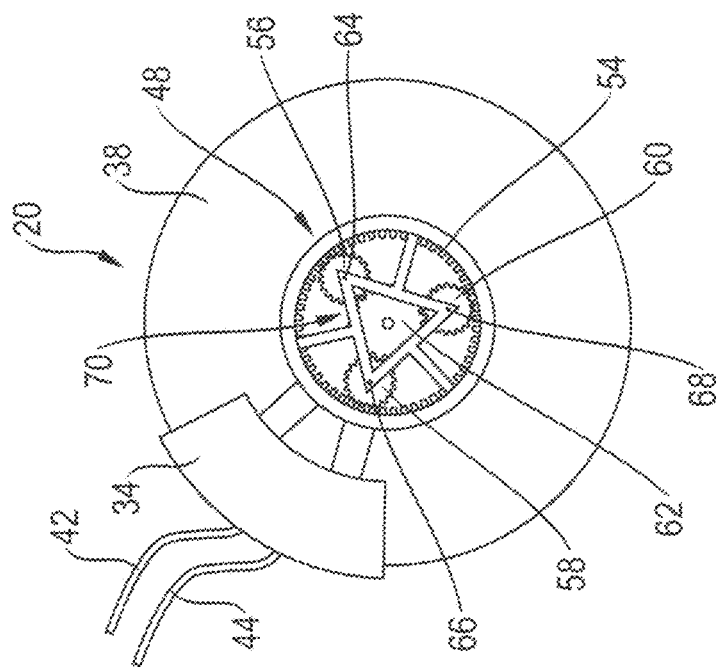
FIG. 4 is a rear view of the drive-brake arrangement of FIG. 2.

FIG. 4 is a rear view of the drive-brake arrangement 20 with an open transmission housing part 50. The planetary transmission 48 basically consists of a ring gear 54, planet gears 56, 58, 60 and a sun gear 62 that inter-engage in a known manner. Here, the ring gear 54 is connected fixedly to the frame part 32, with the brake caliper 34 also being fastened to the outer side of the ring gear 54, in order to ensure a particularly compact drive-brake arrangement 20. The planet gears 56, 58, 60 are connected fixedly to the brake disk 38 and thus to the drive shaft 46 of the front wheel 6 via schematically illustrated bearing members 64, 66, 68 via a planet carrier arrangement 70.

The sun gear 62 in turn is connected fixedly to the rotor 28. By virtue of such a design of the planetary transmission 48, a transmission ratio of $i=n_R/n_A>1$ is made possible when driving the rotor 28. This makes it possible in a particularly simple manner to use so-called high-speed motors as the electric motor 24.

The invention claimed is:

1. A drive-brake arrangement for a wheel of a muscle-powered vehicle (2), comprising: an electric motor (24), with a stator (26) that is connected directly or indirectly to a frame part (32) of a frame arrangement (4), the stator (26) enclosing, in an at least partially annular manner, a disk-shaped rotor (28) having a speed $n_R$, the disk-shaped rotor (28) comprising permanent magnets (30) and being connected operatively to a drive shaft (46) having a speed $n_A$ for conjoint rotation therewith, a brake caliper (34) being arranged on the frame part (34) and having brake shoes (36), the break caliper (32) enclosing, in an at least partially annular manner, a brake disk (36) that is connected operatively to the drive shaft (46) for conjoint rotation therewith, and wherein the rotor (28) is connected operatively to the drive shaft (46) via a planetary transmission (48) in a transmission housing part (50) in such a way that a transmission ratio $i=n_R/n_A>1$ is present.

2. The drive-brake arrangement of claim 1, wherein the planetary transmission (48) comprises; a sun gear (62) operatively connected to the rotor (28), planet gears (56, 58, 60) operatively connected to the drive shaft (46), and a ring gear (54) fixedly connected to the frame part (32).

3. The drive-brake arrangement is of claim 2, wherein the planet gears (56, 58, 60) have bearing members (64, 66, 68) fixedly connected to the brake disk (38).

4. The drive-brake arrangement of claim 2, wherein the ring gear (54) is connected fixedly to the brake caliper (34).

5. The drive-brake arrangement of claim 2, wherein the rotor (28) is mounted pivotably on the brake disk (36).

6. The drive-brake arrangement of claim 1, wherein the stator (26) is arranged on the transmission housing part (50).

7. An electric bicycle comprising: a frame arrangement (4) a rear wheel (6) a front wheel (8) that is mounted pivotably and is connected to a steering arrangement (10), a pedal drive arrangement (12), at least one battery member (18) arranged on the frame arrangement, the drive-brake arrangement (20, 22) of claim 1, and an inverter (40) electrically connected to the drive-brake arrangement (20, 22).

* * * * *